May 26, 1970 G. J. EHALT ET AL 3,514,771

MAGNETIC DRUM ENCLOSURE WITH HEAT TRANSFER

Filed Sept. 26, 1967 2 Sheets-Sheet 1

INVENTORS
GREGORY J. EHALT
WILLIAM H. STARK
BY Charles J. Johnson
ATTORNEY

May 26, 1970 G. J. EHALT ET AL 3,514,771

MAGNETIC DRUM ENCLOSURE WITH HEAT TRANSFER

Filed Sept. 26, 1967 2 Sheets-Sheet 2

3,514,771

MAGNETIC DRUM ENCLOSURE WITH HEAT TRANSFER

Gregory J. Ehalt, Long Lake, and William H. Stark, St. Paul, Minn., assignors to Sperry Rand Corporation, New York, N.Y., a corporation of Delaware Filed Sept. 26, 1967, Ser. No. 670,673
Int. Cl. F28f, *3/12;* G11b *5/40;* H02k *9/19*
U.S. Cl. 340—174.1 6 Claims

ABSTRACT OF THE DISCLOSURE

An improved magnetic drum system enclosure is described, wherein the housing includes passageways therethrough for carrying a coolant-fluid, with the passageways so arranged that the coolant-fluid does not pass in contact with the surface of the rotatable magnetic drum. The enclosure is also adapted to mount transducer selection circuitry. Removable manifold end-plates are also disclosed.

BACKGROUND OF THE INVENTION

Field of the invention

This invention relates generally to the field of dynamic magnetic recording and reading wherein a record member, such as a rotatable drum, is provided with a magnetizable surface upon which discrete areas can be so effected as to provide storage of information indicated by the state of the remanent magnetization. Magnetic transducers are utilized to both record magnetically on the record surface and to read magnetically from the record surface. More specifically, this invention relates to the enclosure for a dynamic magnetic apparatus, wherein the magnetic transducers are positioned for cooperation with the magnetizable surface and are supported in an operative position by the laminar boundary layer of fluid caused by the movement of the record member. Still more specifically, the invention relates to the structure for housing and cooling the drum system.

Description of the prior art

Several prior art systems have provided movable magnetic record surfaces with which magnetic transducers, often referred to as read/write heads, are associated. The prior art has further found various systems for floating the heads on a laminar layer of fluid, such as air, caused by the rapid movement of the record member surface. The latter systems are often referred to as flying-head memory systems. It is well known that this laminar layer exerts forces on the head structure. The advantage of the flying head arrangement is well documented in the prior art and may generally be stated to be a desirable system for maintaining an extremely small air gap spacing between the read/write head and the surface of the movable record medium. It can generally be stated that the closer the space of the read/write head to the surface of the record medium the more efficient is the reading and recording system. Characteristically in the prior art, the spacing has been in the order of one-thousandths of an inch. Improved systems of suspension, both of the drum and of the head structures, have resulted in this spacing being reduced, for instance, to a spacing of fifty millionths of an inch. In the prior art, it has been common practice in the system for cooling the components of the magnetic drum system, to force a coolant-fluid, such as air, adjacent the surface of the drum and over the head structures. With the advent of the closer head spacing to the surface of the drum, it is necessary that the filtering system be greatly improved, if the coolant-fluid is to be run over the surface of the drum. This follows since the particle size of any contaminants that may be allowed to pass through the filter must be greatly reduced in order to be accommodated by the reduced gap. Such enhanced filtering is available, but at a great increase in the manufacturing cost of the total system. Another problem with running the coolant-fluid over the surface of the drum with the reduced gap spacing appears to be that a greater loading force for maintaining the head positioning is required, due to the additional air movement.

Another practice of the prior art was to provide cabling from each of the read/write heads to an external control circuit assembly. The external control circuit assembly was adapted to house the head selection circuitry. Due to the nature of the signals derived from the read/write heads, it was necessary that twisted pairs be utilized in a manner such that a twisted pair was utilized for each head. As the number of heads increased, the cost of the cabling increased proportionately.

It is to the foregoing summarized problems that the invention attends itself. The housing that surrounds the rotatable magnetic drum is adapted to mount the flying heads, and is provided with a plurality of coolant carrying passageways therethrough for carrying a coolant fluid for dissipating the heat. By passing the coolant-fluid through the passageways the coolant-fluid is kept out of contact with the surface of the rotatable drum. By such coolant-fluid carrying passages, the need for filtering of the coolant-fluid is virtually eliminated, since no contaminant particles are allowed to impinge on either the heads or the drum surface. The structure is also provided for mounting head selection circuitry right on the outer surface of the drum enclosure. By adapting the drum housing in such a manner, the number of cables required to be taken to the external circuitry is reduced to the number of lines necessary to specify a designated address, with the actual translation and head selection being done in the drum-housing mounted circuits.

SUMMARY

Briefly, this invention comprises, an improved magnetic drum system including an enclosure for mounting a plurality of flying heads and the head selection circuitry, and having a plurality of coolant-fluid carrying channels running along the length thereof for carrying coolant-fluid while minimizing the amount of filtering required. Filtering can be minimized since the coolant-fluid never comes in contact with the surface of the drum or in contact with the flying heads. Further, the enclosure includes removable manifold end-plates, thereby greatly facilitating maintenance when the drum must be removed due to faulty recording surface or problems of drum suspension. The adjustment of the flying heads need not be altered during removal of the drum; hence, the repair time and cost is greatly reduced. The mounting of the selection circuitry on the exterior surface of the enclosure greatly reduces the amount of external cabling required.

An object of this invention, then, is to provide an improved magnetic drum system enclosure. More specifically, it is an object of this invention to provide a drum enclosure which provides for cooling of the drum without the coolant-fluid ever coming in contact with the moving parts of the drum or read/write heads. Yet another object of the invention is to minimize external cabling. Still a further object of the invention is to provide an improved drum enclosure which provides for much improved ease of maintenance. These and other objects will become apparent from a detailed consideration of this invention, and it will be seen that the invention provides a substantial improvement over the enclosures of the prior art while being substantially more economical than other of the prior art systems.

DESCRIPTION OF THE PREFERRED EMBODIMENT

Figure 1:
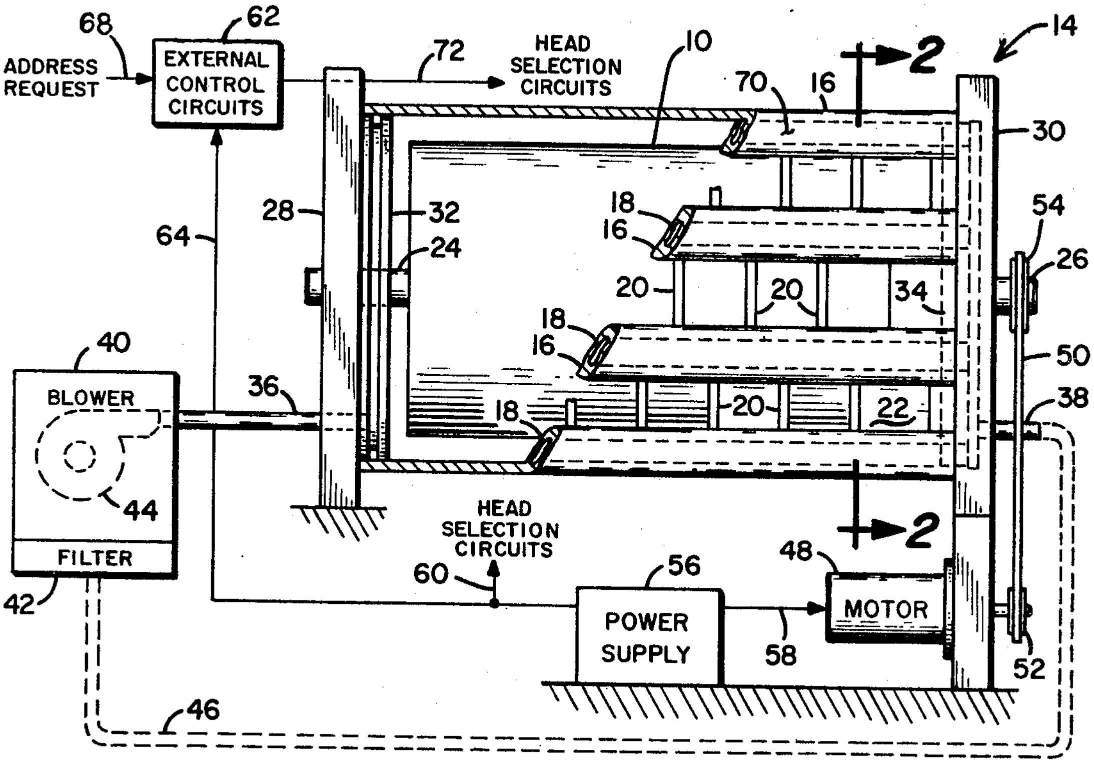
FIG. 1 is a partially schematic side view of the improved drum housing of this invention with a portion thereof shown broken away.

FIG. 1 is a partially schematic side view of the improved drum housing of this invention with a portion thereof shown broken away. This figure illustrates a cylindrical drum member 10 mounted within a grill-like housing, referred to generally as 14. The housing is comprised of a plurality of elongated members 16 which are disposed around the drum 10 and are substantially parallel with the axis thereof. Each of these elongated members 16 has a coolant-fluid carrying channel 18 running along its length from one end of the drum 10 to the other. Adjacent ones of the elongated members 16 are held together by a plurality of curved rib members 20. The combination of the elongated members 16 and the interconnecting curved rib members 20 forms the grill-like enclosure 14 for the drum 10. Access to the surface of the drum is provided, for instance through opening 22, whereby transducer elements can cooperate with the magnetizable surface of the drum 10. The transducer mounting will be illustrated and described in more detail below. The drum 10 is rotatably mounted at each of its ends by axle 24 and 26 extending through support members 28 and 30, respectively. Support members 28 and 30 are utilized to house manifold end-plate members 32 and 34, respectively. The manifold end-plate members will be described in more detail below, it being sufficient at this time the indicate that manifold 32 is coupled to an inlet pipe 36, which is supplied with coolant-fluid, and distributes it to the coolant-fluid carrying channels 18. Manifold 34 operates as the end-plate at the other end of the drum support and operates to collect the coolant-fluid as it is forced out of channels 18 and to exhaust it through exhaust port 38. The coolant-fluid can characteristically be air, which may be supplied by a supply element 40, that would include an air filter 42 and a blower 44. This supply element is coupled to supply pipe 36. Alternatively, if a coolant-fluid other than air is used, provision can be made to recirculate the coolant-fluid by coupling the exhaust port 38 through an auxiliary conduit 46 into the coolant-fluid supply apparatus 40. This would allow the coolant system to be a closed system completely free of contaminants. It is pointed out that in this system the coolant-fluid at no time is forced in contact with the surface of drum 10 since it passes through the input manifold 32, is forced into the coolant carrying channels 18, and ejected through the output manifold 34 through the exhaust port 38. Clearly, then, any contaminants that may be passed by filter 42 will be maintained in the coolant system and will not operate to damage the surface of the drum 10.

The drum system of the type in which the subject invention is utilized, is referred to as a flying-head drum system since the read/write transducer heads are supported on a boundary layer of air caused by the rotation of drum 10. In order to cause the drum to rotate, a motor 48 is mounted in a cooperative relationship with one end of the drum 10. For this embodiment, a belt 50 is coupled to a pulley 52 on the motor drive shaft and to a pulley 54 mounted on axle 26. Alternatively, a direct-drive motor can be utilized. Power for driving the motor is derived through power supply 56 which is electrically coupled through line 58 to motor 48. The power supply 56 is also utilized to supply power to the head selection circuits (not shown) via conductors 60 and to supply power to the drum system external control circuits 62 on conductors 64.

Figure 5:
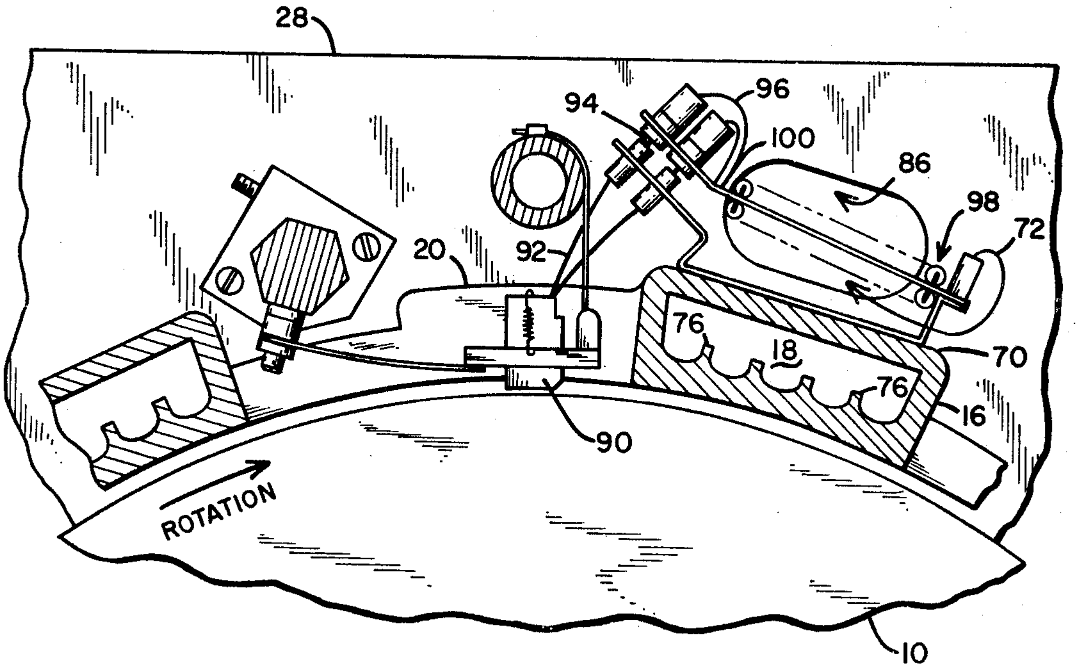
FIG. 5 illustrates the circuit mounting arrangement for performing head selection thereby minimizing the number of signal carrying leads that have to be carried to the external control circuitry.

The function of the external control circuits 62 is to receive an address request as a coded plurality of signals on conductor 68 from a source which is to utilize the drum system. This source does not form a part of the invention and will not be described in detail, it being understood that it can be a computer or other data processing equipment. The function of the address, is to provide in coded form the signals necessary to define a discrete memory register on the surface of the drum. In prior art systems, the external control circuits included the translation matrix for operating on the address thus presented, and providing the individual selection signals to the desired read/write transducers. This of necessity meant that twisted-pair wires for each of the transducers had to be carried in cable form from the external control circuits to the various transducers. This drum system, as will be described in more detail in conjunction with FIG. 5, provides for the mounting of the head selection circuits on the outer surface 70 of the head selection circuitry. This means that the external control circuit 62 can provide the coded signals on conductors 72 into the drum system, thereby greatly reducing the number of conductors that must be passed into the drum area. Due to the coolant-fluid passing through channels 18, the heat generated in the drum system as well as any heat generated in the head selection circuits are effectively dissipated.

The transducer mounting and positioning apparatus is not shown in detail, but can be of the type shown in U.S. Pat. 3,202,974, entitled "Fluid Supported Members" with Allen K. Baillif, the inventor, and Sperry Rand Corporation the assignee, said assignee being the same as that of the subject invention. It is not felt that further detail of the raising and lowering mechanism is necessary for an understanding of the subject invention.

Figure 2:
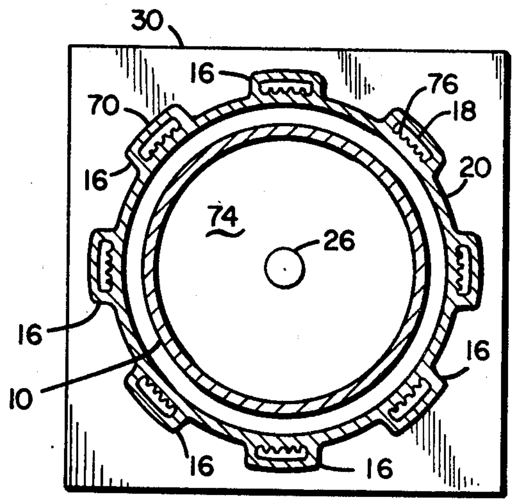
FIG. 2 is a cross-sectional view taken along lines 2—2 in FIG. 1 and illustrates the arrangement of the coolant channels around the drum surface.

FIG. 2 is a cross-sectional view taken along lines 2—2 in FIG. 1 and illustrates the arrangement of the coolant-fluid carrying channels 18 around the drum surface. It can be seen that support member 30 supports one end of the structure. This figure illustrates that drum 10 is essentially a cylindrical member having end 74 mounted to axle 26. The drum has a magnetizable coating and is in the form of a cylinder. The magnetizable coating is deposited on the outer surface of this cylinder. The elongated members 16 are coupled together by the curved rib members 20. It can be seen that the inner surfaces of the elongated members 16 and the curved rib members 20 form a surface concentric with that of the outer surface of drum 10 but out of contact therewith. The outer surfaces 70 of the elongated members 16 form the mounting positions for the head selection circuits. In considering the coolant-fluid carrying channels 18, it will be noted that each of the channels has disposed therein a plurality of fin-like members 76. These fin-like members operate to provide a greater surface in contact with the coolant-fluid being driven through channels 18 for more efficiently dissipating the heat transferred from the drum area into the elongated members and through the coolant-fluid.

Figure 4:
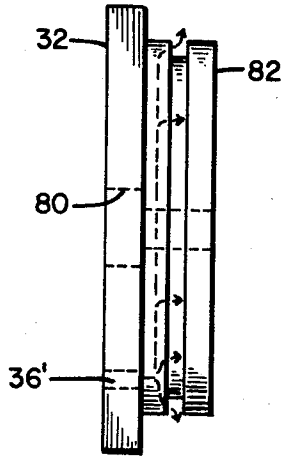
FIG. 4 is a side view of the end-plate and illustrates the way in which the coolant-fluid is distributed to the various channels.
Figure 3:
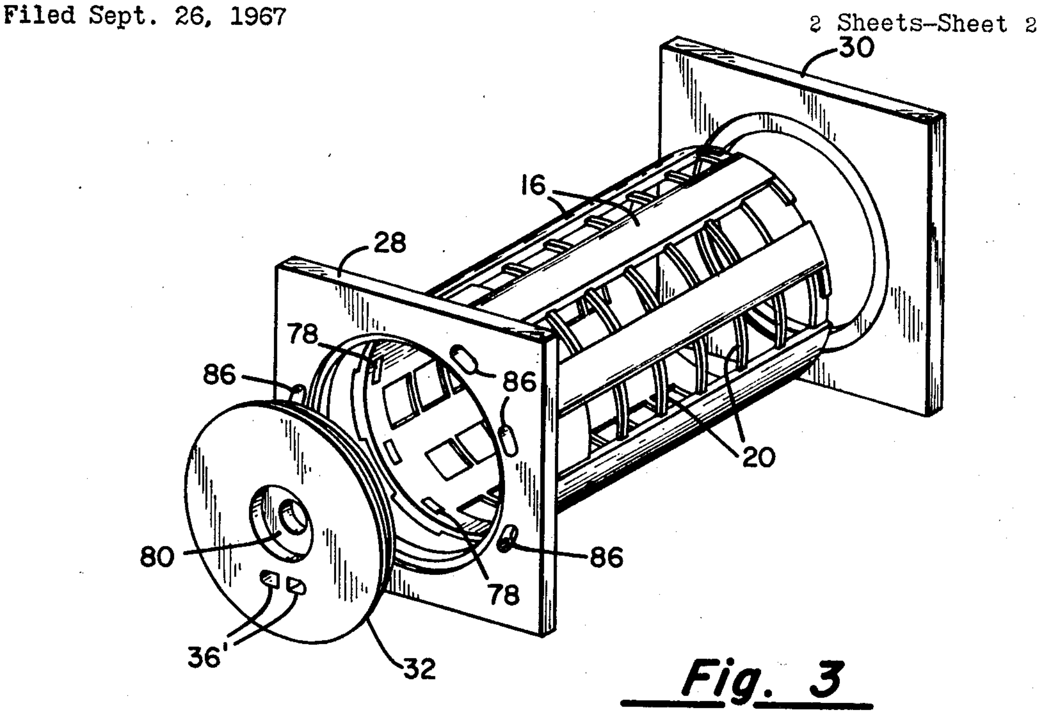
FIG. 3 is an exploded perspective view of the drum housing showing the two support members, the coolant-fluid carrying channels and head mount structure, and the removable manifold end-plate.

FIG. 3 is an exploded perspective view of the drum housing showing the two support members 28 and 30, the elongated members 16, the curved rib members 20, and the removable manifold end-plate 32. In this figure it can be seen that the removable manifold end-plate 32 slips into the support member 28 from one side. The grill-like housing formed by the elongated members 16 and the rib members 20 fits into the support member 28 from the back side of support member 28. A portion of the manifold end-plate 32 operates to cooperate with the inlet ports 78. Turning briefly to a consideration of FIG. 4, which is a side view of the end-plate 32, there is illustrated the way in which the coolant-fluid is distributed to the various coolant carrying channels 18. It can be seen that the intake 36′ passes through the end-plate portion and into the hollow manifold chamber which surrounds the drum axle supporting portion 80. On the internal end of the manifold end-plate, there is seal portion 82 which contacts the inner surface of the grill-like housing 14 and prevents the coolant-fluid from passing into the direct contact with the drum 10. The manifold is provided with a circular groove which is in a cooperative relationship with the inlet ports 78, whereby air forced in through the intake 36′ passes through the hollow chamber, around the groove, and is dispersed into the various coolant-fluid carrying channels 18. The manifold end-plate at the exhaust end is substantially the same as that at the input end and need not be described further, it being understood that the air passes from the outlet ports (not shown) into the manifold portion and out the exhaust port. The dotted arrows in FIG. 4 illustrate the flow direction of the coolant-fluid at the input end.

Returning now to a consideration of FIG. 3, it will be seen that support member 28 is aso provided with a plurality of apertures 86 through which the cables 72 from the external control circuits 62 can pass into the drum area. In FIG. 5 is illustrated the circuit mounting arrangement for performing head selection which thereby minimizes the number of signal carrying leads that have to be carried to the external control circuitry. A read/write transducer assembly 90 is supported in the drum area. The raising and lowering mechanism can be that of the Baillif patent. The transducer assembly is coupled electrically through a flexible cable 92 into a connector assembly 94 which is mounted on surface 70 of elongated member 16. Connector 94 is coupled through cable 96 to the head selection circuits 98 mounted on board 100. The head selection circuit is comprised of a plurality of digital circuits which would include transistors, diodes, resistors and the like, but which are not shown in detail since the circuits do not form a part of this invention, and are well known in the art. Cable 72 is directed through support member 28 by passing it through aperture 86 to the external control circuits. It can be seen therefore that the mounting arrangement greatly reduces the number of conductor leads that must be brought into the drum area.

This figure also illustrates the fin-like projections 76 which are in coolant-fluid carrying channel 18.

From the foregoing, it can be seen that the various objectives of the invention have been fully described and the advantages set forth. It being understood that various modifications will become evident to those skilled in the art, while remaining within the spirit and scope of the invention, what is desired to be protected by Letters Patent is set forth in the appended claims.

What is claimed is:

1. A memory system comprising: a cylindrical drum member having a predetermined axial length and a circular peripheral surface having a magnetizable coating thereon, said drum member including first and second ends each having means for supporting the associated end of said drum member; a plurality of elongated members parallelly arranged in a spaced apart order around said peripheral surface, each of said elongated members having a curved surface in a heat transferring relation to said peripheral surface and not in contact therewith, each of said elongated members further including a coolant-fluid carrying channel having an inlet port and an outlet port, said channel extending along at least a portion of the length thereof for keeping the coolant-fluid out of direct contact with said peripheral surface; a plurality of curved rib members disposed intermediate and coupled at opposite ends to adjacent ones of said elongated members, the combination of said rib members and said elongated members forming a grill-like enclosure for said drum peripheral surface, the openings in said grill-like enclosure for providing access to the magnetizable surface of said drum member; input manifold means in cooperative relation with said inlet ports for receiving a coolant-fluid and dispersing it in said coolant carrying channels; output manifold means in cooperative relation with said outlet ports for selecting and exhausting said coolant-fluid for removing heat from the drums; first and second support members for mounting said input manifold means and said output manifold means respectively; means for rotatably mounting said first and second ends of said drum member in said input manifold means and said output manifold means respectively; coolant-fluid supply means coupled to said input manifold means for supplying said coolant-fluid to said channels; drive means coupled to said drum member for causing said drum member to be rotated at a predetermined rate; and a plurality of transducer means disposed in said openings in said grill-like enclosure for cooperating with said magnetizable surface for recording information on said magnetizable surface and reading information previously recorded on said magnetizable surface.

2. A memory system as in claim 1 wherein each of said elongated members further include a plurality of heat-transfer fin means extending along the length of said coolant-fluid carrying channel for increasing the heat transfer surface in cooperation with the coolant-fluid passing through said channel.

3. For use in a magnetic drum system, a housing comprising: a plurality of elongated members coupled in a spaced apart relationship for cooperating in a heat transferring manner with the surface of an associated magnetic drum, each of said members including a coolant-fluid carrying channel having a coolant-fluid inlet port and a coolant-fluid outlet port and said channel extending along at least a portion of the length of said member for keeping said coolant-fluid out of direct contact with the surface of an associated drum, each of said elongated members including an outer surface for mounting transducer selection circuits to be activated, the mounting on said elongated members for minimizing the number of control conductors brought into the drum unit for connection to selection circuits; input manifold means in cooperative relation with said inlet ports for receiving a coolant-fluid and dispersing it in said coolant carrying channels; output manifold means in cooperative relation with said outlet ports for collecting and exhausting said coolant-fluid, thereby removing heat from drum system; first and second support members for mounting said input manifold means and said output manifold means respectively, at least one of said support members including at least one aperture therethrough for said control conductors to pass from the control circuitry to said selection circuits, wherein said input manifold means and said output manifold means each include a drum mounting for rotatably mounting and supporting an associated end of a magnetic drum; a drum member having a predetermined axial length and a circular outer peripheral surface, said drum having a first end supported by said drum mounting in said input manifold and a second end supported by said drum mounting in said output manifold; said drum member having a magnetic coating on said outer surface; and drive means for causing said drum member to rotate.

4. A housing as in claim 3 wherein each of said elongated members further include a plurality of heat-transfer fin means extending along the length of said coolant-fluid carrying channel for increasing the heat transfer surface in cooperation with the coolant-fluid passing through said channel.

5. A housing as in claim 3 and further including coolant-fluid supply means coupled to said input manifold means for supplying said coolant-fluid to said channels.

6. A housing as in claim 5 and further including coolant-fluid return means coupled to said output manifold means for returning said coolant-fluid to said supply means for causing said coolant-fluid to be recirculated in a closed system through said channels.

References Cited

UNITED STATES PATENTS

| | | | |
|---|---|---|---|
| 2,862,120 | 11/1958 | Onsrud | 165—47 |
| 2,947,957 | 8/1960 | Spindler | 165—47 |
| 3,033,537 | 5/1962 | Brown | 165—47 |
| 3,192,306 | 6/1965 | Skonnord | 312—236 |
| 3,334,684 | 8/1967 | Roush et al. | 165—47 |
| 3,437,965 | 4/1969 | Ragsdale | 165—47 |

BERNARD KONICK, Primary Examiner

V. P. CANNEY, Assistant Examiner

U.S. Cl. X.R.

165—47, 168; 312—236